United States Patent [19]

Pappers

[11] Patent Number: 5,135,282
[45] Date of Patent: Aug. 4, 1992

[54] MOTOR VEHICLE SEAT BACK

[75] Inventor: Rudolf Pappers, Munich, Fed. Rep. of Germany

[73] Assignee: Man Nutzfahrzeuge Aktiengesellschaft, Munich, Fed. Rep. of Germany

[21] Appl. No.: 665,296

[22] Filed: Mar. 6, 1991

Related U.S. Application Data

[63] Continuation-in-part of Ser. No. 395,887, Aug. 18, 1989, abandoned.

[51] Int. Cl.⁵ .................................................. A47C 3/00
[52] U.S. Cl. ............................ 297/284 B; 297/284 E; 297/284 C; 128/38; 5/453
[58] Field of Search .................. 297/DIG. 3, 284, 312, 297/217; 128/38, 33; 5/449, 453, 455, 456

[56] References Cited

U.S. PATENT DOCUMENTS

| | | | |
|---|---|---|---|
| 3,483,862 | 12/1969 | Takeuchi | 128/33 |
| 3,678,520 | 7/1972 | Evans | 297/DIG. 3 |
| 3,982,786 | 9/1976 | Burgin et al. | 297/DIG. 3 |
| 4,583,255 | 4/1986 | Mogaki et al. | 5/453 |

Primary Examiner—Peter A. Aschenbrenner
Attorney, Agent, or Firm—McAulay Fisher Nissen Goldberg & Kiel

[57] ABSTRACT

A seat back for use in private or commercial vehicles is disclosed constituting a pulsation cushion formed having a plurality of expandable chambers interconnected by pressure limiting valves. The valves are responsive to fluid under pressure to produce a sequential rolling wave in the chambers to modify the cross-sectional amplitude of the seat back in the longitudinal and/or transverse direction thereby to massage the back of a person occupying the seat. An adjustable pulsing device is provided to control the supply rate of the fluid and the frequency and amplitude of pulsation.

16 Claims, 2 Drawing Sheets

MOTOR VEHICLE SEAT BACK

CROSS REFERENCE TO RELATED APPLICATION

This application is a continuation-in-part of application Ser. No. 395,887 filed Aug. 18, 1989, now abandoned.

BACKGROUND OF THE INVENTION

1. Field of the Invention

This invention relates generally to a seat back for use in vehicles and, more specifically, to a seat back cushion used by the driver or a passenger in private and/or commercial vehicles which produces a massaging effect.

2. Description of the Prior Art

Drivers and passengers in motor vehicles often suffer from bodily complaints during long runs. These complaints may be very distressing and may in the long term lead to permanent impairment of health, more particularly, among truck and bus drivers who are subject to such stress for long periods of time. It also is to be noted that such impairment of bodily wellbeing may have effects on the state of mind; that is, the driver's attention may be distracted in traffic and there is generally a disadvantageous effect on the mental health of the driver or passenger which is hardly conducive to concentration on other traffic.

Many attempts have been made to design seats which are more ergonomic in structure. The results so far have only led to gradual changes in design with a slight improvement in comfort since all such improved seat designs have been static. In a vehicle, however, it is necessary for the driver or passenger to stretch himself or herself, that is to say he or she has to perform a dynamic act having a massaging effect.

Even where seat structures have been provided with massaging apparatus, the results have not proven entirely satisfactory. For example, in U.S. Pat. No. 3,483,862 issued Dec. 16, 1969 in the name of Shigeo Takeuchi, there is disclosed a therapeutic spot pressure apparatus which utilizes a fluid pressure generating mechanism to expand portions of an armchair to cyclically apply spot pressure to points on the human body sitting thereon. However, the structure is rather intricate in requiring separate pressure conduit lines to each of the expansible bellows-like members which apply the spot pressure. Also, the expansible units are not coupled together by pressure valves which are deemed necessary to provide an effective wave-like massaging motion.

In U.S. Pat. No. 3,678,520 issued July 25, 1972 in the name of Ronald James Peter Evans, there is disclosed a pressure pad for bed patients which includes collapsible air cells that are inflated and deflated from time to time. Here, again, the air cells are not coupled together by pressure valves for effective wave motion.

In U.S. Pat. No. 3,982,786 issued Sept. 28, 1976 in the names of Gerard Burgin et al., there is disclosed a seat and back rest cushion composed of expansible portions, some of which are interconnected by valves to vary the pressure therein upon a change in seating position. While the seat provides comfort by accommodating body movements, there is no wave massaging effect.

In U.S. Pat. No. 4,583,255 issued Apr. 22, 1986 in the names of Tadashisa Mogaki et al., there is disclosed a mat having separate expansible air chambers subjected to pressure changes to induce a wave motion for purpose of massage. Here, again, the chambers are not coupled together by pressure valves. Instead, a separate supply line is provided for each chamber which renders the mat cumbersome to manufacture. Also, the mat is not readily adaptable for use as a seat back in a vehicle.

In French Patent No. 2,373,996 dated Aug. 18, 1978 in the name of Roger Tallon, there is disclosed a chair composed of flexible tubular compartments subjected to fluid flow under pressure. However, the compartments are not interconnected with one another by valves so that there is no wave produced for purpose of massage.

The present invention improves over these known devices in the manner hereinafter described.

SUMMARY OF THE INVENTION

The motor vehicle seat back of the present invention includes a pulsation cushion formed having a plurality of individual expandable chambers. Fluid under pressure is supplied by a supply line to the first one of the chambers and a fluid return line is connected to the last one of the chambers. An adjustable pulsing device is provided in the supply line to control the supply rate of the fluid and the frequency and amplitude of pulsation.

Pressure limiting valves are provided to connect the chambers with each other. A venting valve also is provided in the first one of the chambers. The valves are responsive to the fluid under pressure to produce a sequential rolling wave in the chambers to modify the cross-sectional amplitude of the seat back in the longitudinal and/or transverse direction thereby to massage the back of a person occupying the seat.

Accordingly, it is an object of the present invention to provide a pulsation cushion as a separable component of a seat back, and which has valve interconnected expandable chambers capable of being driven by a fluid, so that a fluidic wave with sectionally varying amplitude is caused to roll in the longitudinal and/or transverse direction of the cushion along the back of a person using the seat.

Additional features and advantages of the invention will become more apparent from a consideration of the following detailed description when taken in conjunction with the accompanying drawings.

DESCRIPTION OF THE PREFERRED EMBODIMENTS

Figure 1:
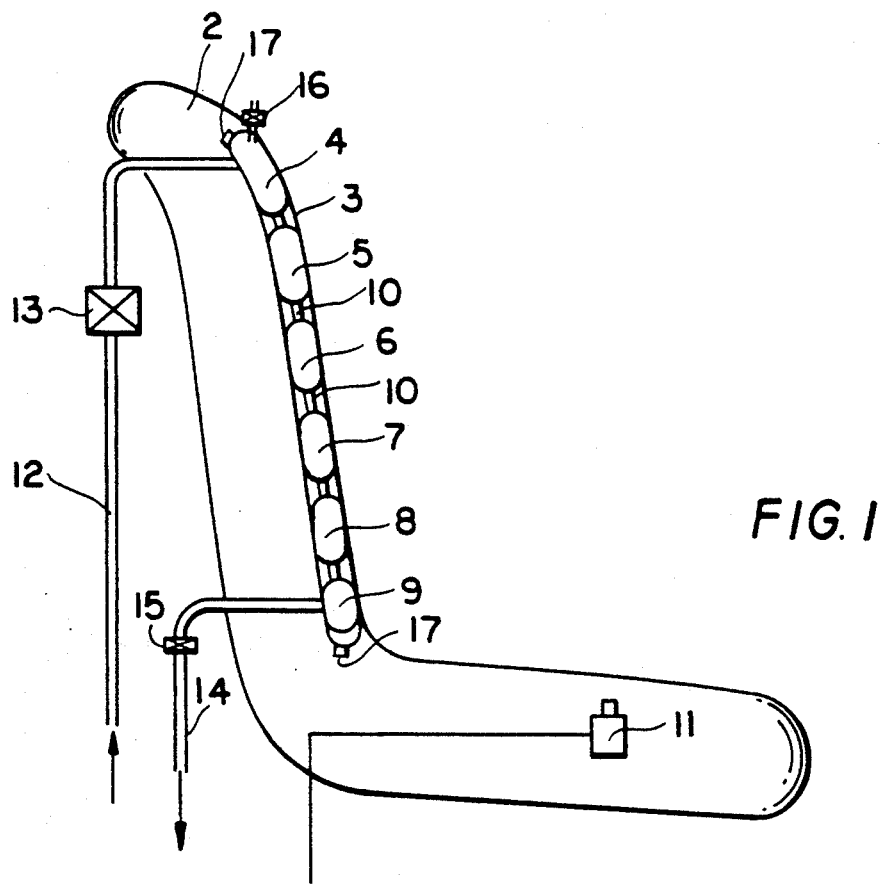
FIG. 1 is a longitudinal sectional view taken through the seat back constructed in accordance with the present invention.

Referring to the drawings, numeral 1 represents a seat back member intended for use with a seat 2 of a motor vehicle. Seat back 1 is constructed of a hose-like or tubular deformable elastic casing 3 to define a pulsation cushion. The cushion 3 is constructed having a plurality of individual self-supporting elastic chambers 4 through 9 extending horizontally along the width of seat 2 and spaced-apart along the vertical or longitudinal extent of the cushion.

Chambers 4-9 are individually sealed but are connected with each other by a series of pressure limiting valves each represented generally by numeral 10. That is, a separate valve arrangement 10 connects adjacent chambers together to permit fluid flow therebetween. The construction and operation of such valve arrangement will be more fully disclosed hereinafter.

A switch 11 is placed within convenient reach of the seat occupant, as for example to the side of seat 2. When the switch is operated, compressed air is caused to flow to the first chamber 4 of cushion 3 through pipe or conduit 12 by means of an adjustable pulsing device 13. Upon reaching a certain pressure level in chamber 4, the pressure limiting valve 10 connecting chambers 4 and 5 is rendered operable to permit fluid flow into chamber 5. The sequence continues between successive chambers to cause a wave-like motion in cushion 3 in a longitudinal direction for massaging the back of the seat occupant. A fluid return pipe or conduit 14 having a pressure limiting valve 15 is connected to the last chamber and leads to a fluid reservoir (not shown). Chamber 4 is vented by means of pressure limiting valve 16.

The adjustable pulsing device 13, typically operated by a solenoid valve controlled by an electrical signal as is well known in the art, controls the compressed air supply rate and the frequency of pulsation. Using this pulsing device, which may be operated in accordance with a program, it is also possible to set the absolute magnitudes of the amplitude and frequency of pulsation. It is also possible to vary the amplitude of pulsation during a cycle or during a number of cycles in accordance with a program. Furthermore, the pulsation frequency may be arranged to be able to be varied in accordance with a program or freely. It is in this manner that the desired massage motion may be adapted to suit the individual physiological requirements of the sitting person so as to be in accord with the respective driving situation and various parameters being set in the controlling mechanism of the seat back.

Figure 2:
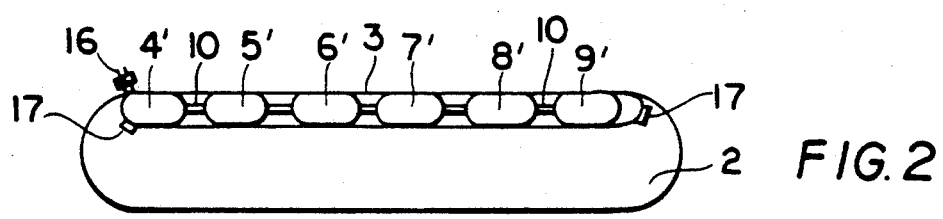
FIG. 2 is a transverse sectional view through the seat back showing another embodiment of the invention.

FIG. 2 illustrates another embodiment of the invention wherein chambers 4'-9' are arranged to extend vertically along the length of seat 2. In such event, chambers 4'-9' are spaced-apart along the transverse or horizontal extent of cushion 3'. The chambers are connected by the valve arrangement 10 previously described so that the operation is virtually identical. The difference resulting from this configuration is that the rolling wave is created in a transverse direction of the cushion, rather than the longitudinal direction, upon application of pressurized fluid. It also is within the scope of the invention that the cushion may be constructed to provide for a plurality of chambers extending both in vertical and horizontal directions to provide wave patterns in alternating directions.

There are various ways of producing the sequential rolling wave in chambers 4-9. For example, with reference to FIG. 1, valves 10 may be spring loaded poppet valves designed to permit flow in one direction only; that is in the direction from chamber 4 to chamber 9. Valves 15 and 16 also may be similar acting poppet valves. In operation, valve 15 in return line 14 is normally closed and may be programmed to open at a pressure, for example, of 25 psi. Venting valve 16, for this embodiment, functions as a safety valve and is normally closed. Valve 16 may be programmed to open at a pressure of 30 psi. The valves 10 separating and interconnecting adjacent chambers are normally closed and are programmed to open at a pressure of 20 psi.

Pressure is introduced into the first chamber 4 by means of pulsing device 13 which serves to inflate the chamber. When the pressure in chamber 4 reaches 20 psi, valve 10 separating chambers 4 and 5 opens to permit fluid flow into chamber 5. In the event valve 10 is defective and does not open, safety valve 16 will open when the pressure in chamber 4 reaches 30 psi thereby to vent the pressure therein and prevent damage to the cushion.

Pulsing device 13 continues in operation to now inflate both chambers 4 and 5. When the pressure in chamber 5 reaches 20 psi, the valve 10 connecting chambers 5 and 6 opens to permit fluid flow into chamber 6. This manner of operation continues until all of the chambers 4-9 are inflated to 20 psi in a sequential manner to produce a wave-like motion in cushion 3 in a longitudinal direction.

With all the chambers thus inflated, continued operation of pulse generator 13 increases the pressure in all chambers. When the pressure within chamber 9 reaches 25 psi, valve 15 in return pipe 14 opens and fluid flow to chamber 4 is pulsed "off." Fluid flow communication is now provided between chamber 9 and pipe 14. As the pressure reduces in chamber 9, the differential in pressure between chambers 8 and 9 is such to permit fluid to flow from chamber 8 into chamber This operation continues until all the chambers 4-9 are deflated in a sequential manner in the same order in which they previously were inflated. This, again, produces a wave motion in the chambers. When the pressure in chambers 4-9 has been reduced to an amount, for example, 5 psi, the valves 10 interconnecting the chambers and valve 15 in return line 14 close whereupon the procedure repeats itself upon actuation of the pulse generator.

In another operative arrangement, valve 15 may be eliminated in return pipe 14 whereupon the opening of valve 10 between chambers 8 and 9 serves to permit fluid flow from chamber 8 to return pipe 14 via chamber 9 without significant inflation of chamber 9. The wave produced for this arrangement is effectively through the inflation and deflation of chambers 4-8.

Figure 3:
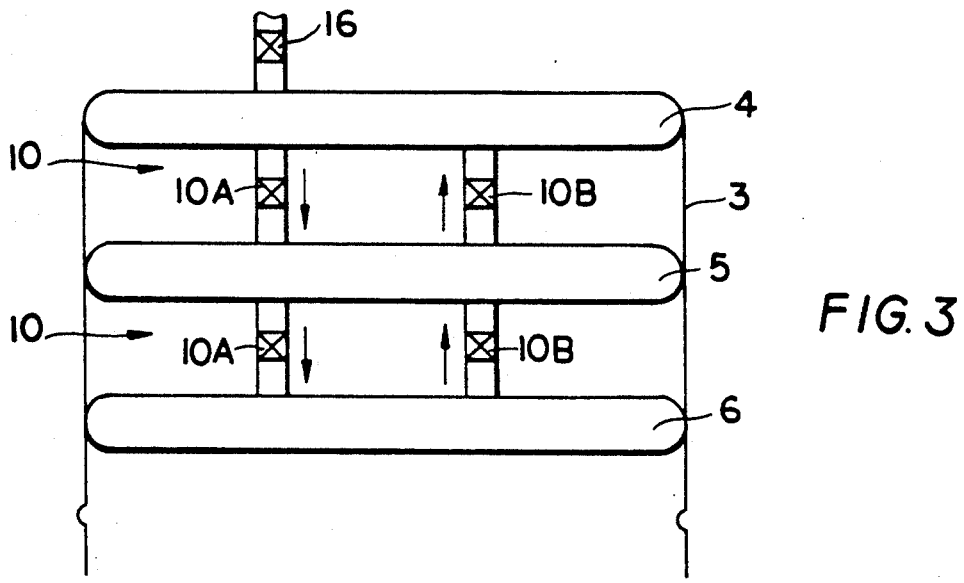
FIG. 3 is a partial front elevational view of the seat back showing yet another embodiment of the invention.

In yet another operative arrangement, return pipe 14 may be eliminated entirely and the deflation of chambers 4-9 takes place through venting valve 16. This is covered by the embodiment of FIG. 3 wherein each of the pressure limiting valves 10 is composed of a pair of oppositely facing spring loaded poppet valves 10A and 10B. The arrangement is such that valve 10A permits fluid flow only in the direction of the arrow, such as from chamber 4 to chamber 5, whereas valve 10B permits fluid flow only in the opposite direction. Valves 10A and 10B are normally closed and are rendered operative; that is, displaced to an open position, only at certain pressures.

For example, venting valve 16 in chamber 4 is normally closed and will not open until the pressure in chamber 4 reaches, for example, 25 psi. Pressure introduced into chamber 4 by means of pulsing device 13 serves to inflate chamber 4 to a pressure of, for example, 20 psi whereupon valve 10A opens. At this stage, valve 10B remains closed as well as venting valve 16. Fluid now is permitted to flow into chamber 5. At such time as the pressure in chamber 5 reaches 20 psi, valve 10A separating chambers 5 and 6 opens to permit fluid flow into chamber 6. This sequence continues until all the chambers 4–9 are inflated to 20 psi in a sequential manner to cause a wave in cushion 3.

With all the chambers 4–9 thus inflated, continued operation of pulse generator 13 increases the pressure in chamber 4 to an amount, for example, 25 psi whereupon venting valve 16 opens. Fluid flow to chamber 4 is now pulsed "off" and the pressure within chamber 4 vents to the atmosphere. As the pressure reduces in chamber 4, the differential in pressure between chambers 4 and 5 is such that the normally closed valve 10B separating these chambers opens to permit fluid to reversely flow from chamber 5 into chamber 4 and be vented. Valve 10A is closed during this reverse flow operation. This operation continues until all of the chambers 4–9 are deflated in a reverse sequential manner. When the pressure in chambers 4–9 has been reduced to an amount, for example 5 psi, the valves 10B and venting valve 16 close whereupon the procedure repeats itself upon actuation of the pulse generator thereby to produce a wave-like motion of cushion 3 by the sequential inflating and deflating of the chambers 4–9.

Figure 4A:
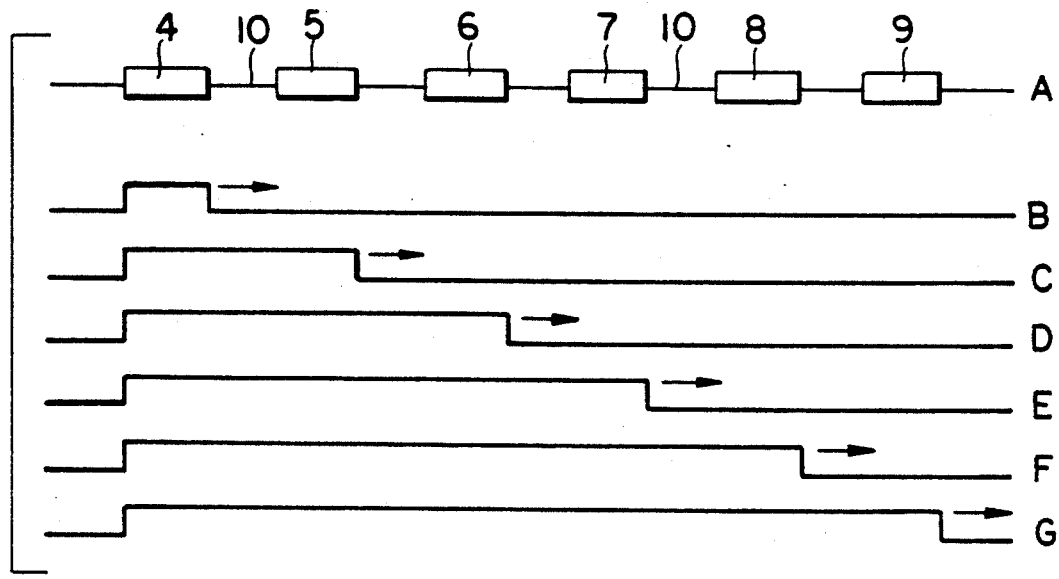
FIGS. 4A and 4B are schematic illustrations of the wave being produced upon sequential inflation and deflation of the chambers in the seat back.
Figure 4B:
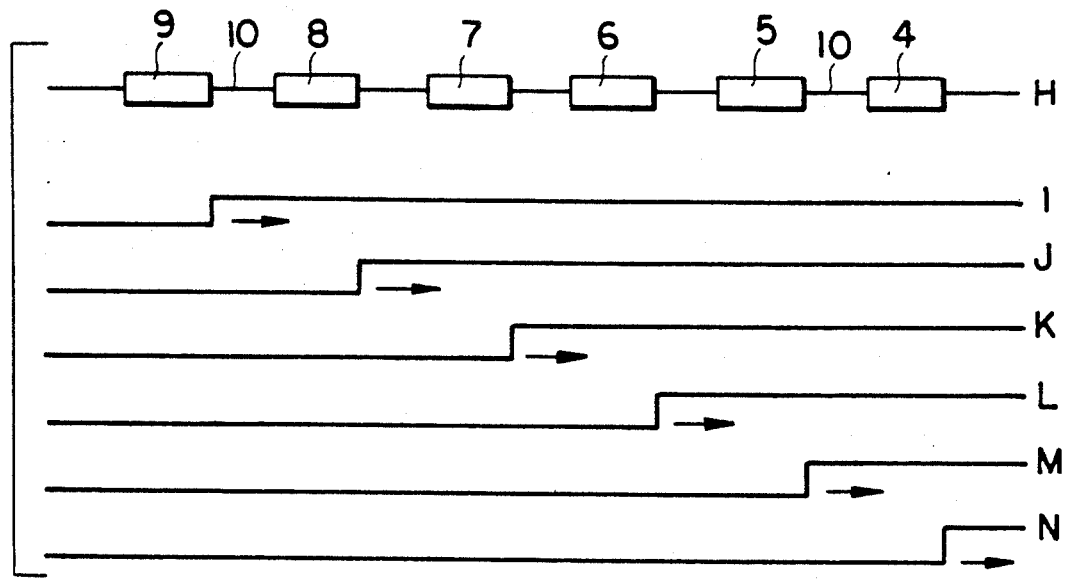

FIGS. 4A and 4B illustrate schematically the inflation and deflation of chambers 4–9 in a sequential manner. In this regard, line A in FIG. 4A illustrates the chambers in their deflated state. As the chambers are sequentially driven by fluid from the pulse generator passing through the connecting valves 10, a wave front is generated moving in the direction of the arrows along the cushion. This is illustrated by lines B–G in FIG. 4A. Conversely, line H in FIG. 4B represents the chambers 4–9 in their inflated state. As the pressure in chamber 4 is vented and the pulse generator is pulsed "off", the various chambers will back flow their respective pressures through the connecting valves and out through chamber 4. This is illustrated by lines I–N in FIG. 4B.

The pulsation cushion may consist of flexible fluid-tight material, such as rubber or plastic, in which the fluidic wave is produced by air so that the back of the seat occupant is subjected to a gentle oscillating or massaging effect. The use of air as the fluid medium in particularly suitable in commercial vehicles which generally have a supply of compressed air for brake operation.

In accordance with a further feature of the invention, it is envisioned that the pulsation cushion 3 be removably attached to the seat 2 by snaps, hooks or Velcro fasteners, represented generally by numeral 17. This enables the cushion to be removed from the seat and used as a couch member or mat on which the driver may sleep. This offers the advantage that, on long runs where the driver may have difficulty in sleeping on the seat at a rest station, he or she may simply remove the cushion from the seat and use it as a mat which, with the help of the pulsations, will produce a soothing and relaxing effect on the driver's muscles and nerves.

While the foregoing description and drawings represent the preferred embodiments of the present invention, it will be obvious to those skilled in the art that various changes and modifications may be made therein without departing from the true spirit and scope of the present invention.

We claim:

1. A seat back member for use with a seat in a motor vehicle, said member comprising:
   a pulsation cushion fitted to the back-support portion of the seat, said cushion including a plurality of individual expandable chambers;
   mean for supplying interrupted fluid under pressure from a single fluid line to said cushion; and
   means associated with said chambers and responsive to said fluid supply means to permit sequential inflation and deflation of said chambers to produce a rolling wave motion in said cushion thereby to modify the cross-sectional amplitude of said seat back member in a longitudinal and/or transverse direction, said wave producing means including pressure limiting valves connecting said chambers with each other and being operative to permit the inflation and deflation of said chambers;
   whereby said rolling wave functions to massage the back of a person occupying the seat.

2. The seat back member of claim 1, wherein the said cushion is composed of rubber or a flexible plastic.

3. The seat back member of claim 1, wherein the fluid is compressed air.

4. The seat back member of claim 1, wherein said fluid supply means comprises adjustable pulsing means for controlling the supply rate of the fluid and the frequency of pulsation.

5. The seat back member of claim 1, wherein said fluid supply means is capable of varying the amplitude of pulsation.

6. The seat back member of claim 1, wherein said fluid supply means is capable of varying the frequency of pulsation.

7. The seat back member of claim 1, wherein the pulsation frequency is able to be varied freely or in accordance with a program.

8. The seat back member of claim 1, wherein the said cushion is in the form of an elongated elastic tubular member, said plurality of chambers being formed in said tubular member.

9. The seat back member of claim 1, further comprising means to allow said cushion to be removed from the seat and used as a couch member in a commercial vehicle for sleeping purposes.

10. The seat back member of claim 1, wherein said wave producing means further includes venting means in the first one of said individual chambers.

11. The seat back member of claim 1, wherein the last one of said chambers is coupled to a fluid return line, and said wave producing means further includes a valve in said fluid return line.

12. The seat back member of claim 4, including a switch located in the vicinity of an occupant of the seat for controlling the operation of said pulsing means.

13. A seat back member for use with a seat in a motor vehicle, said member comprising:
   a pulsation cushion fitted to the back-support portion of the seat, said cushion including a plurality of individual expandable chambers;
   means for supplying interrupted fluid under pressure from a single fluid line to a first one of said chambers, said fluid supply means including a fluid return line connected to the last one of the said chambers;
   said fluid supply means comprising adjustable pulsing means for controlling the supply rate of the fluid and the frequency and amplitude of pulsation; and
   means associated with said chambers and responsive to said fluid supply means to permit sequential inflation and deflation of said chambers to produce a rolling wave motion in said cushion thereby to modify the cross-sectional amplitude of said seat back member in a longitudinal and/or transverse direction;

said wave producing means including venting means connected to said first one of said chambers, and pressure limited valves connecting said chambers with each other and being operative to permit the inflation and deflation of said chambers;

whereby said rolling wave functions to massage the back of a person occupying the seat.

14. The seat back member of claim 13, wherein the pulsation frequency is able to be varied freely or in accordance with a program.

15. The seat back member of claim 13, including a switch located in the vicinity of an occupant of the seat for controlling the operation of said pulsing means.

16. The seat back member of claim 13, wherein said wave producing means further includes a valve in said fluid return line.

* * * * *